April 12, 1955   G. O. GRAVES ET AL   2,705,927
APPARATUS FOR REDUCING AND COMMINUTING CEREAL GRAIN
Filed Dec. 30, 1949   2 Sheets-Sheet 1

DARWIN F. ROSEBROOK
GEORGE O. GRAVES.
INVENTORS.

BY Oltsch & Knoblock

ATTORNEYS.

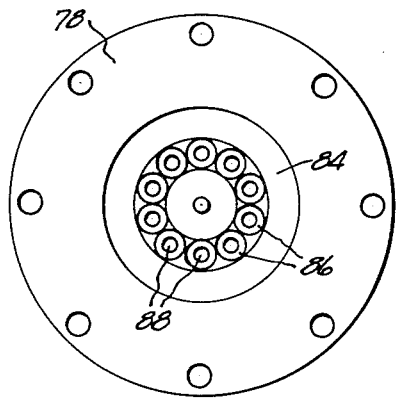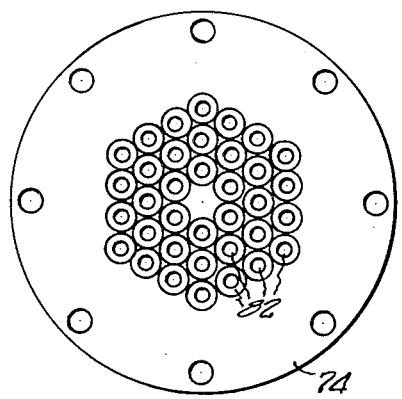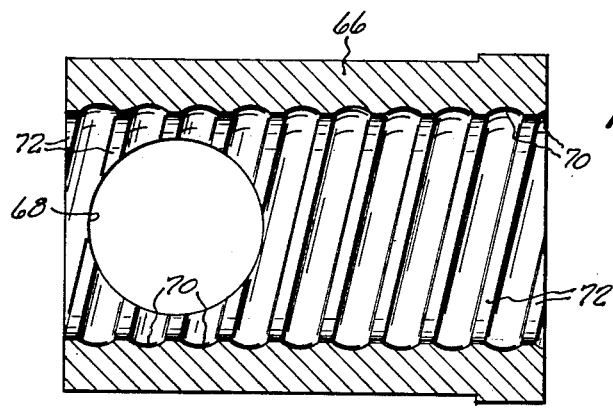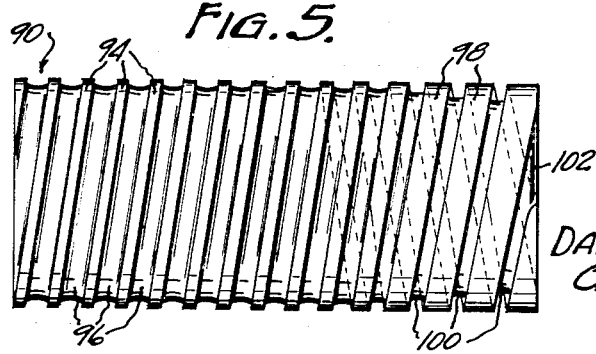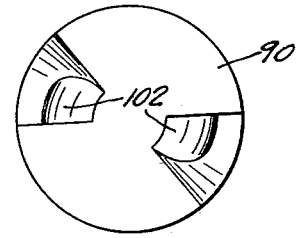

ated Apr. 12, 1955

2,705,927

APPARATUS FOR REDUCING AND
COMMINUTING CEREAL GRAIN

George O. Graves and Darwin F. Rosebrook, South Bend,
Ind., assignors to G. & R. Corporation, South Bend,
Ind., a corporation of Indiana Application December 30, 1949, Serial No. 136,096

14 Claims. (Cl. 107—14)

This invention relates to an apparatus for reducing and comminuting cereal grain.

The invention relates particularly to apparatus for forming or extruding an elongated puffed or expanded cornmeal product adapted to be cooked in its extruded form. Such cornmeal products are now common and are widely distributed. They are characterized by an elongated, generally cylindrical form, by a cheese coating or flavoring, and are rigid, cellular and brittle when cooked, so that they are chewy. A uniform consistency or density is desirable in the product to avoid hard spots or detract from its chewy character.

Therefore, the primary object of this invention is to uniformly comminute or reduce cereal grain to a fine consistency and then expand or puff it uniformly.

A further object is to provide a device of this character wherein ground cereal grain is extruded by a series of successive extruding operations, of which the final operation is performed under greater pressure and higher velocity than the preceding operation.

A further object is to provide a device wherein a rotatable grain grinding member having a helical advancing screw is constructed to discharge and force ground cereal through a plurality of extrusion apertures arranged in a plurality of concentric series.

A further object is to provide a device of this character having a rotatable grinding and advancing member provided with helical peripheral ribs or screw threads which are spaced apart uniformly for the major portion of said member, which increase in width progressively from an intermediate point to the discharge end of said member, and which are separated by grooves whose depth increases progressively at the portion at which the rib width increases.

Other objects will be apparent from the following specification.

In the drawings:

Fig. 2 is an inner face view of one of the extruding plates of the device.

Fig. 3 is an inner face view of another extrusion plate of the device.

Fig. 4 is an axial sectional view illustrating the cylindrical grinding chamber of the device.

Fig. 5 is a side view of the cylindrical rotatable grinding and advancing member of the device.

Fig. 6 is an end view of the advancing member as seen from the right in Fig. 5.

Figure 1:
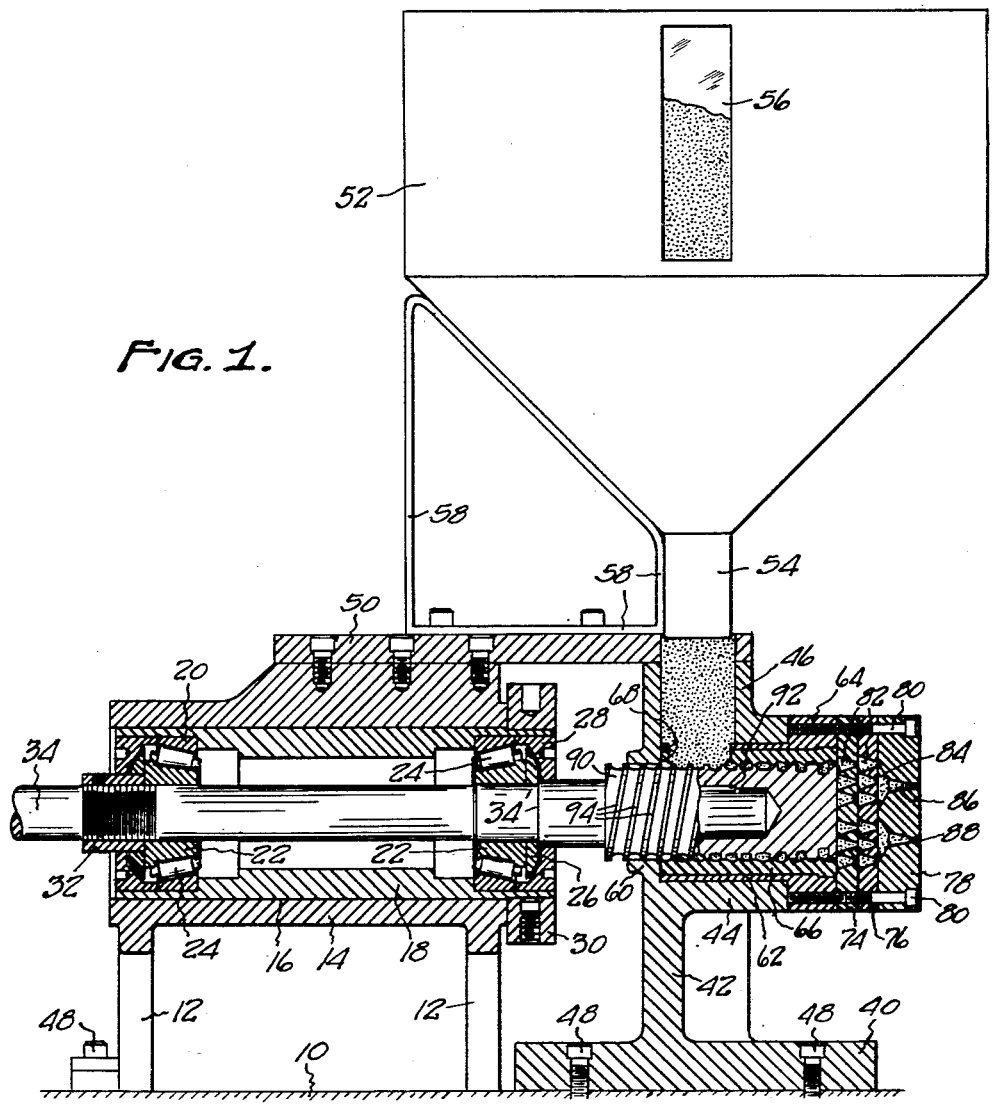
Fig. 1 is a side view of the device with parts illustrated in axial vertical section.

Referring to the drawings which illustrate the preferred embodiment of the invention, the numeral 10 designates a base or standard which may be formed of metal, concrete or of any other material found suitable. Upon this base is supported and mounted, by legs or other uprights 12, a housing member 14 having a bore or passage 16 extending therethrough which is lined by a tubular member 18 whose inner periphery is stepped at spaced points. A pair of thrust bearings, each including an outer race 20, an inner race 22 and rollers 24, is positioned within the housing liner 18 at opposite ends thereof. Suitable retainers 26 bear against the inner races 22, and outer retainers 28 bear against the outer races 20, the latter preferably being screw-threaded within the bore of the liner 18. An outer positioning ring 30 may be threaded upon a portion of the liner projecting from the housing 14 at one end. A sleeve 32 may cooperate with the bearing at the opposite end of the housing. The two bearings serve to journal a drive shaft 34 which may be stepped at various points along its length as desired, and which terminates in a reduced splined end portion. The shaft 34 will be driven by any suitable prime mover (not shown).

The splined end of the shaft 34 projects outwardly from the housing 14 and beyond the adjacent bearings and retainers.

A comminuting unit is mounted on the foundation or base member 10 alongside the housing 14, having a base plate 40 which is firmly anchored upon the foundation and an upright 42 which supports a tubular portion 44 with which an upwardly projecting neck portion 46 communicates. The tubular portion 44 of the comminuting unit will preferably be positioned with its bore concentric with and in axial alignment with the axis of the shaft 34, which shaft projects into said bore. Any suitable securing means 48 may be employed to secure the members 12 and 40 to the base 10 to maintain the desired spacing and relation of the parts. In addition, a rigid plate 50 may be bolted or otherwise secured fixedly to the upper parts of the housing 14 and the frame of the comminuting unit to provide additional means for holding the parts fixed, one relative to the other.

A hopper member 52 has a spout 54 communicating with and adapted to discharge into the neck member 46. As illustrated, this hopper may include a transparent or window portion 56 to reveal the level of the contents of the hopper. Any suitable means may be employed to hold the hopper in its proper position, there being illustrated herein a bracket 58 of generally triangular form which is bolted or otherwise anchored to the plate 50 and to which the tapered lower portion of the hopper and the spout 54 thereof may be welded or otherwise secured.

The tubular portion 44 has a restricted concentric portion 60 at one end thereof. An adapter sleeve 62 fits within the large diameter bore portion of the tubular member 44, having an inner bore which is of substantially larger diameter than the bore of the reduced portion 60 of the tubular member 44. The sleeve 62 has an enlarged circumferential flange portion 64 formed at its outer end, and the parts are so constructed that when the flange 64 bears against the outer end of the tubular part 44, the inner end of the sleeve adapter 62 will bear against the shoulder defined by the reduced portion 60 of the tubular part. The adapter sleeve 62 will preferably have a pressed fit in the tubular portion 44 which firmly anchors it in said tubular portion. However, any other means found suitable for securing the adapter in the tubular portion 44 may be employed. A liner sleeve 66 has a snug fit within the adapter sleeve 62 and is of the same length as the adapter sleeve 62 so that, when its inner end bears against the shoulder at the reduced portion 60 of the housing, the opposite end edge of said sleeve will lie flush with the end surface of the flange 64 of the adapter sleeve 62. The sleeves 62 and 66 are provided with registering apertures 68 which register and communicate with the tubular portion 46 of the frame. The sleeve 66 has one or more sets of helical grooves 70 formed therein, there being two such grooves as shown, which define a double helical rib 72 extending the full length of the sleeve. The ribs 72 are of the same diameter as the diameter of the bore of the reduced part 60 of the frame, so that said rib surfaces form a continuation of the bore of the part 60 and are interrupted only at the aperture 68. The grooves 70 are shallow and are of uniform lead, width and spacing throughout the entire length of the sleeve.

A plurality of extrusion plates 74, 76 and 78 are arranged preferably in face contacting engagement, as illustrated in Fig. 1, being secured together and to the flange 64 by means of securing bolts 80 extending through openings in the margins of said plates and arranged in equispaced relation. The plates 74 and 76 are both preferably of the construction illustrated in Fig. 3, being characterized by a plurality of concentric series of tapered openings 82. The large diameter portions of the openings are positioned inwardly. The openings are arranged in a plurality of substantially circular series concentric with the plate, here shown as three such series disposed or arranged to constitute substantially a hexagonal pattern. In the preferred embodiment, each aperture in each series is positioned alongside other apertures in the same series with the centers of the apertures being spaced apart a distance equal to the diameter of the large dimension end of the apertures. Each aperture also is positioned alongside one or more apertures in an adjoining series. Consequently, at the apertured portion there exists only a very small extent of space between the different apertures. The outermost apertures substantially coincide with the bore diameter of the sleeve 66, and the other series are positioned inwardly therefrom.

The two plates 74, 76 are preferably positioned as illustrated in Fig. 1 with the apertures 82 of each in axial alignment with apertures of the other, with the plates substantially in face engagement, and with the taper of the apertures of each plate extending in the same outward direction.

The outer plate 78 is of the construction and character best illustrated in Fig. 2, being characterized by an annular concentric groove 84 formed in its inner face, so located and arranged that the small diameter end of each aperture in the plate 76 will discharge into said groove 84. Centrally of the groove is positioned a circular series of tapered apertures 86 which terminate in small diameter outer end or discharge aperture portions 88, each of substantially the same size as the size of the small or reduced ends of the extrusion apertures 82. Since there is only one circular series of apertures in plate 78, and since the discharge dimensions of the apertures of all of the extrusion plates 74, 76, 78 are substantially the same, it will be apparent that the total extrusion area of the apertures of the outermost plate 78 is substantially less than the total extrusion area of the apertures in either of the plates 74 and 76.

A rotor member 90 fits rotatably within the housing bore 60 and the bore of the sleeve 66, having formed therein a bore to receive the end of shaft 34 which is splined thereto at 92. The member 90 is preferably of a length greater than the length of the bore of the parts 60, 66 and its innermost end surface preferably bears against the inner face of the plate 74, as illustrated in Fig. 1. The construction of the member 90 is best illustrated in Fig. 5, the same being characterized by formation of a double lead helical screw 94 of substantially uniform dimension throughout the full length of the member 90, which dimension is substantially equal to the diameter of the bore 60 so as to have a snug but freely rotating fit therein. The helical ribs are separated by shallow helical grooves 96 throughout the major portion of their extent. Adjacent to the discharge end of the member 90 the device is characterized by a progressively increasing width of the ribs, as shown at 98. This is coupled with a progressive increase in the depth of the grooves between the ribs, as shown at 100, the increase in width preferably being correlated with the increase in depth so that, considered as a feed screw, the amount of material fed by the helix will be substantially uniform at all points throughout its length. The extreme terminus 102 of each of the grooves at the discharge end of the member 90 is characterized by a rapid increase in depth to such an extent that material in said grooves may be discharged into the innermost series of extrusion openings in the plate 74. In other words, the end of the member 90 is formed, as illustrated in Fig. 6, so as to insure that each of the circular series of openings 82 in the extrusion plate 74 will be fully supplied with the material fed by the member 90.

In the operation of the device with the parts constructed and arranged as illustrated in Fig. 1, it will be apparent that when the hopper 52 is filled with cornmeal or other cereal grain to be processed, that grain will discharge freely through the spout 54 and the neck 46 into the tubular horizontal chamber defined by the sleeve 66 into which the grain passes through the aperture 68 in said sleeve spaced from its inner end. The shaft 34, being suitably supported and journaled in bearings which give it a firm support, and being driven by a suitable source of power, rotates the member 90 and causes the cereal grain or meal to be advanced toward the right in Fig. 1.

In cases where cornmeal is used, the meal is preferably moistened slightly. Thus, for example, two quarts of water may be added to 100 pounds of cornmeal. As the moistened cornmeal is propelled lengthwise, a back pressure develops due to the resistance of the extrusion plates to free discharge of the cornmeal from the sleeve 66, and this back pressure causes the grooves of both the member 90 and the sleeve 66 to be completely filled. Consequently, as the member 90 rotates under these conditions where the meal completely fills the grooves, the meal or grain is ground or reduced to substantially uniform fineness less than the fineness of normal cornmeal.

The extrusion operation entailing forcing of the meal successively through the tapered apertures 82 of the plates 74 and 76 serves to change the consistency of the meal by reason of the fact that the meal is subjected to progressively increased pressure as it is forced through the tapered apertures and then at its discharge that pressure is suddenly released. As here shown, that process is carried on twice. It will be understood, however, that, if desired, only one initial extrusion plate need be used, or, alternatively, more than two such plates may be used. The second extrusion operation is followed, in the device illustrated, by a third extrusion step in which, by reason of the substantial reduction of the total extrusion area of the apertures 88 of the plate 78 compared to the total extrusion area of the apertures 82 of the plates 74 and 76, the pressure to which the cornmeal is subjected is very greatly increased. As the meal or cereal grain passes through the apertures 86, 88 in the final extrusion step, the pressure applied thereto is very high so that upon discharging from the apertures 88, the sudden release of pressure causes a uniform expansion of the cornmeal, to produce a cellular coherent strip or cylinder of uniform dimension, such as a diameter of ⅜ to ½ inch and of substantial length. The moisture content causes the cornmeal to stick together in the coherent cellular mass and to retain the desired cylindrical elongated shape.

In the case of cornmeal, the extruded strips may then be cooked, the cooking operation usually being preceded by the application of a small quantity of cheese as a surface coating. The strips may either be dipped in molten cheese or the cheese may be sprayed or otherwise applied to the strips. The cheese penetrates into the product and, after cooking, has penetrated the entire unit for flavoring purposes without leaving any skin or coating layer in usual instances.

The back pressure generated incident to the extrusion operation acts upon the member 90 and the shaft 34 to cause end play of said parts. The extrusion operation requires that such end play be reduced to a minimum in order to be effective. To accomplish this purpose, the bearings 22 are of the thrust type and the shaft 34 is shouldered at 34' at a point engaging the right-hand bearing retainer 26. This construction effectively resists end play of the shaft toward the left. It will be understood that the splined joint between the shaft 34 and the member 90 is such as to prevent end play or relative longitudinal movement of parts. These factors, together with the firm anchoring of the bearing housing 14 and the base 40 of the extrusion unit to a common support 10 by means of the anchoring bolts 48, insures the requisite freedom of the construction from end play which would be detrimental to the efficiency of the extrusion operation.

While the preferred embodiment of the invention has been illustrated and described herein, it will be understood that changes in the construction may be made within the scope of the appended claims without departing from the spirit of the invention.

We claim:

1. A device for comminuting and extruding cereal grain, comprising a cylindrical housing having a bore defined in part for the major portion of its length by a shallow helical groove, said housing having a feed opening therein between its ends, a rotor fitting in said housing bore and having a helical rib at its periphery of a diameter substantially equal to the diameter of said bore for snug rotative fit in said bore, and a pair of extrusion plates spanning the discharge end of said housing and each having extrusion openings communicating with openings in the other, the outermost plate having fewer openings and a lesser total area of extrusion openings than the inner plate.

2. A device for puffing cereal grain, comprising a horizontal tubular body member having a feed opening intermediate its ends, a feed hopper communicating with said feed opening, a feed screw rotatable in said body member, a plate spanning the discharge end of said body member and having a substantially circular series of extrusion apertures therein, and a second plate spanning the outer face of said first plate and having a lesser number of extrusion apertures each communicating with a plurality of the apertures in said first plate, the apertures of said plates being of substantially equal size.

3. A device for puffing cereal grain, comprising a chamber defined in part by an apertured wall, means for propelling said cereal toward said apertured wall and through the apertures therein, and an apertured plate fixedly secured to said chamber exteriorly thereof and confronting and engaging said apertured wall and having a number of apertures and a total aperture area less than that of said wall whereby said cereal is subjected to greater pressure when passing through said plate apertures than when passing through said wall apertures the apertures in said plate being open for full and unrestricted communication with the apertures of said wall.

4. A device for puffing cereal grain, comprising a chamber defined in part by an apertured wall, means for propelling said cereal toward said apertured wall and through the apertures therein, and an apertured plate secured to said chamber exteriorly thereof and confronting said apertured wall and having a number of apertures and a total aperture area less than that of said wall whereby said cereal is subjected to greater velocity when passing through said plate apertures than when passing through said wall apertures, each aperture being tapered with its largest cross-sectional dimension at its intake end.

5. A device for puffing cereal grain, comprising a chamber defined in part by an apertured wall, means for propelling said cereal toward said apertured wall and through the apertures therein, and an apertured plate fixedly secured to said chamber exteriorly thereof and confronting and engaging said apertured wall and having a number of apertures and a total aperture area less than that of said wall whereby said cereal is subjected to greater pressure when passing through said plate apertures than when passing through said wall apertures, said propelling means including a feed screw rotating in and having a snug peripheral fit in said chamber, said chamber having a screw-receiving bore defined in part by a helical groove, the apertures of said plate and wall being in free communication.

6. A device for puffing cereal grain, comprising a chamber defined in part by an apertured wall, means for propelling said cereal toward said apertured wall and through the apertures therein, and an apertured plate secured to said chamber exteriorly thereof and confronting said apertured wall and having a number of apertures and a total aperture area less than that of said wall whereby said cereal is subjected to greater pressure when passing through said plate apertures than when passing through said wall apertures, the apertures in said wall being arranged in a plurality of substantially circular series arranged one within another, and the apertures in said plate being arranged in a single circular series.

7. A device for puffing cereal grain, comprising a chamber defined in part by an apertured wall, means for propelling said cereal toward said apertured wall and through the apertures therein, and an apertured plate secured to said chamber exteriorly thereof and confronting said apertured wall and having a number of apertures and a total aperture area less than that of said wall whereby said cereal is subjected to greater pressure when passing through said plate apertures than when passing through said wall apertures, said plate being positioned in face engagement with said wall and being grooved at its inner face in communication with each wall aperture.

8. A device for puffing cereal grain, comprising a chamber defined in part by an apertured wall, means for propelling said cereal toward said apertured wall and through the apertures therein, and an apertured plate fixedly secured to said chamber exteriorly thereof and confronting said apertured wall and having a number of apertures and a total aperture area less than that of said wall whereby said cereal is subjected to greater pressure when passing through said plate apertures than when passing through said wall apertures, and a second plate interposed between and engaging said first plate and said wall in fixed relation thereto and having a plurality of apertures therein substantially equal to and of the same size as the apertures in said wall and each communicating with a wall aperture.

9. A device for puffing cereal grain, comprising a chamber defined in part by an apertured wall, means for propelling said cereal toward said apertured wall at a predetermined rate proportional to its speed of operation and also propelling said cereal through the apertures therein, an apertured plate secured to said chamber exteriorly thereof and confronting said apertured wall and having a number of apertures and a total aperture area less than the area of the apertures of said wall whereby said cereal is subjected to greater pressure when passing through said plate apertures than when passing through said wall apertures, said wall and plate each constituting an individual element, and means fixedly securing said wall and plate to said chamber in face contacting engagement with each other with their apertures in fully open communication.

10. A device for puffing cereal grain, comprising a chambered member having a bore therethrough, an apertured extrusion plate having a plurality of substantially concentric series of extrusion apertures, a second apertured extrusion plate having a smaller number and area of extrusion openings than said first plate, said second plate being positioned in fixed substantially face contacting engagement with said first plate with its apertures communicating freely with the apertures of said first plate, and a feed screw having a snug rotative fit in said chamber bore for advancing cereal material to said plates at a predetermined rate proportional to its speed.

11. A device for puffing cereal grain, comprising a chambered member having a bore therethrough, an apertured extrusion plate having a plurality of substantially concentric series of extrusion apertures, a second apertured extrusion plate having a smaller number and area of extrusion openings than said first plate, said second plate being positioned in substantially face contacting engagement with said first plate with its apertures communicating with the apertures of said first plate, and a substantially cylindrical member having a snug rotating fit in said bore with its inner end substantially in face engagement with said first plate, said member having a helical peripheral groove of sufficient depth at its inner end to feed cereal material to all extrusion apertures of said first plate.

12. A device for puffing cereal grain, comprising a chambered member having a bore therethrough, an apertured extrusion plate having a plurality of substantially concentric series of extrusion apertures, a second apertured extrusion plate having a smaller number and area of extrusion openings than said first plate, said second plate being positioned in substantially face contacting engagement with said first plate with its apertures communicating with the apertures of said first plate, and a substantially cylindrical member having a snug rotating fit in said bore with its inner end substantially in face engagement with said first plate, said member having a helical peripheral groove characterized adjacent to its discharge end by a progressively increasing depth, whereby cereal material is fed thereby to the apertures of all series in said first plate.

13. A device for puffing cereal grain, comprising a chambered member having a bore therethrough, an apertured extrusion plate having a plurality of substantially concentric series of extrusion apertures, a second apertured extrusion plate having a smaller number and area of extrusion openings than said first plate, said second plate being positioned in substantially face contacting engagement with said first plate with its apertures communicating with the apertures of said first plate, and a substantially cylindrical member having a snug rotating fit in said bore with its inner end substantially in face engagement with said first plate, said member having a helical peripheral groove characterized adjacent to its discharge end by a progressively increasing depth, a progressively reducing width, and a substantially uniform lead.

14. A device for puffing cereal grain, comprising a chambered member having a bore theerthrough, an apertured extrusion plate having a plurality of substantially concentric series of extrusion apertures, a second apertured extrusion plate having a smaller number and area of extrusion openings than said first plate, said second plate being positioned in fixed substantially face contacting engagement with said first plate with its apertures communicating freely and fully with the apertures of said first plate, and a feed screw rotatable in said chamber bore for advancing cereal material to said plates, said bore being interrupted by a helical peripheral groove.

References Cited in the file of this patent

UNITED STATES PATENTS

| | | |
|---|---|---|
| 1,647,196 | Rollman | Nov. 1, 1927 |
| 1,773,552 | Sizer | Aug. 19, 1930 |
| 1,946,740 | Hall | Feb. 13, 1934 |
| 2,583,600 | Schreiber | Jan. 29, 1952 |